United States Patent
Ishikawa et al.

[15] 3,654,481
[45] Apr. 4, 1972

[54] DEVICE FOR PREVENTING CONTINUATION OF IGNITION IN AN AUTOMOBILE GASOLINE ENGINE

[72] Inventors: Toshio Ishikawa, Kariya; Yosizi Yamamoto, Toyohashi, both of Japan

[73] Assignee: Nippondenso Kabushiki Kaisha, Aichi-ken, Japan

[22] Filed: July 10, 1970

[21] Appl. No.: 53,738

[52] U.S. Cl. ............................ 307/10 R, 318/383, 180/82
[51] Int. Cl. .................................................. H02g 3/00
[58] Field of Search ............. 318/383; 290/37, 38; 123/179; 307/9, 10; 180/82

[56] References Cited

UNITED STATES PATENTS

| | | | |
|---|---|---|---|
| 3,440,398 | 4/1969 | Nilssen | 307/10 R |
| 3,317,740 | 5/1967 | Saj et al. | 307/10 R X |

*Primary Examiner*—Herman J. Hohauser
*Attorney*—Cushman, Darby & Cushman

[57] ABSTRACT

In an automobile with a load circuit consisting of an ignition coil in parallel with at least one d-c permanent magnet motor for auxiliary equipment including a car heater, a car cooler and the like, a device for preventing continuation of ignition, whereby the electric power generated by the force of inertia in said d-c permanent magnet motor is prevented from being supplied to said ignition coil when the engine key switch of the automobile is opened.

8 Claims, 5 Drawing Figures

3,654,481

DEVICE FOR PREVENTING CONTINUATION OF IGNITION IN AN AUTOMOBILE GASOLINE ENGINE

BACKGROUND OF THE INVENTION

1. Field of the Invention

The present invention relates to a device for preventing an automobile gasoline engine from running for a short period due to continuation of ignition after opening the engine key switch.

2. Description of the Prior Art

In the prior art, a gasoline engine on an automotive vehicle continues to run for a short period of time due to continuation of ignition, even after the ignition coil has been cut-off from the power supply by switching off the engine key switch, and this often poses safety problems.

As a result of various experiments and studies conducted on the causes of continuation of ignition of gasoline engines, the inventor of the present invention discovered the following phenomenon as one of the causes of such continuation of ignition:

Automobiles generally use a number of small d-c motors for such auxiliary equipment as a car heater and a cooler. Formerly, it was the practice to use a d-c series-wound motor, but a d-c permanent magnet motor which involves a permanent magnet such as a barium-ferrite magnet has recently come to be employed for these purposes. After the engine key is switched off while the d-c permanent magnet motor for a car heater or a car cooler is running, the above-mentioned motor continues to move for a while due to the force of inertia therein, even though the power supply from the battery needed for ignition has been cut-off. For this reason, the d-c permanent magnet motor functions as a generator for such a period because of the permanent magnet employed and generates electric power, supplying the power to the ignition coil connected in parallel with the d-c permanent magnet motor. Hence the engine continues to work.

SUMMARY OF THE INVENTION

An object of the present invention is to provide, in an automobile with a parallel circuit consisting of a d-c permanent magnet motor and an ignition coil which are in turn connected to a source battery through an engine key, a device for preventing continuation of ignition by preventing the ignition coil from being supplied with power which is generated by the force of inertia in the d-c permanent magnet motor when the engine key is switched off.

According to the present invention, a device for the prevention of continuation of ignition comprises a rectifier which prevents a d-c current from flowing from the d-c permanent magnet motor to the ignition coil is provided; or a relay with an exciting coil connected in parallel with the ignition coil is provided; or a switch which opens or closes in harmony with the operation of the engine key is provided; or an earth contact which closes when the engine key switch is opened is provided.

Adopting these very simple circuit configurations, the electric current which is generated by the force of inertia of the d-c permanent magnet motor in an automobile when its engine key is switched off is prevented from flowing into a load such as the ignition coil. This completely eliminates the phenomenon in which gasoline in the engine is automatically ignited to drive the automobile, even after the engine key is switched off. Therefore, the present invention is expected to produce a very valuable effect from the viewpoint of the reduction of traffic accidents.

BRIEF DESCRIPTION OF THE DRAWINGS:

In the above drawings, the identical symbols represent the same or equivalent parts.

DESCRIPTION OF THE PREFERRED EMBODIMENTS:

Before explaining the embodiment of the present invention, description will be made of an electric circuit in the prior art with reference to a drawing.

Figure 1:
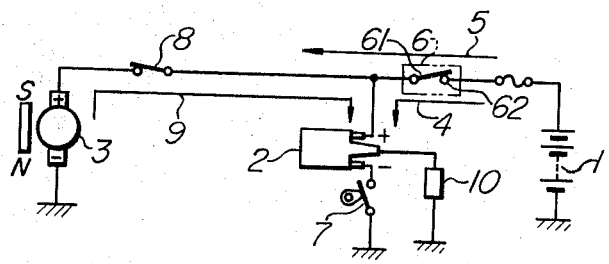
FIG. 1 shows an electric wiring diagram of that parts of the most common automobile which is necessary for the description of the present invention.

FIG. 1 shows the outline of the common electric circuit for an automobile which is necessary for describing the present invention. The reference numeral 1 identifies a source battery which supplies power to a parallel load circuit consisting of an ignition coil 2 and a d-c permanent magnet motor 3 and to other loads (not shown) in the directions shown by arrows 4 and 5. The numeral 6 indicates an engine key switch, whose movable contact and terminal on the power side, respectively shown by the numerals 61 and 62, are inserted between the source battery 1 and the ignition coil 2. The above engine key switch supplies and cuts-off the power to the ignition coil 2 and other loads. 7 stands for an interrupter for a distributor (not shown) to energize the spark plugs. It is a common practice that the above-mentioned d-c permanent magnet motor 3 for use with a car heater or a cooler is connected in parallel with the ignition coil 2. This is to eliminate the inconvenience which may often result when the d-c permanent magnet motor 3 does not stop at the same time that the ignition coil ceases to function after the engine key switch 6 is opened. The numeral 8 shows a switch for arbitrarily turning on and off the d-c permanent magnet motor 3. The numeral 10 shows a spark plug of the engine.

In the above circuit shown in FIG. 1, assume that the movable contact 61 is detached from the power-side terminal 62 of the engine key switch 6 after the automobile has reached its destination while the small d-c permanent magnet motor 3 continues running to drive, for example, a heater or a cooler. Ordinarily, the current from the source battery 1 to the parallel load circuit made up of the ignition coil 2 and the d-c permanent magnet motor 3 is cut-off, and so the ignition coil 2 stops generating a high voltage, resulting in the engine being halted. And of course the d-c permanent magnet motor 3 should stop. As described above, however, the d-c permanent magnet motor 3 continues its rotating for several seconds due to the force of inertia and functions as a d-c permanent magnet generator, supplying the d-c power so generated to the ignition coil 2 in the direction of arrow 9. Thus the ignition coil continues to generate a high voltage and therefore the engine tends to keep on running until the force of inertia becomes zero.

Figure 2:
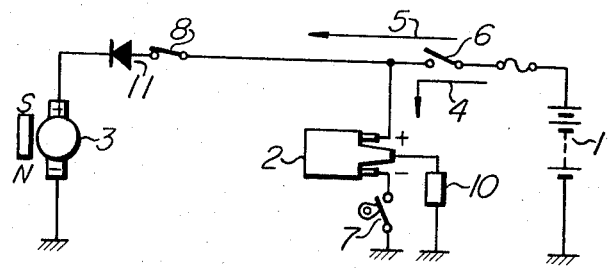
FIGS. 2, 3, 4 and 5 are electric wiring diagrams each showing a part of an electric circuit for an automobile according to an embodiment of the present invention.

FIG. 2 shows an electric wiring diagram of an embodiment of the present invention, in which, in addition to the elements of the circuit in FIG. 1, a rectifier 11 for checking a reverse current is connected in series with the d-c permanent magnet motor 3 to prevent the current from flowing from the d-c permanent magnet motor 3 to the loads including the ignition coil 2 connected in parallel with the d-c permanent magnet motor 3. The connection of the rectifier 11 in series with the d-c permanent magnet motor enables the rectifier 11 to block the current which is generated due to the inertia force of the d-c permanent magnet motor 3 with the result that no current passes through the ignition coil or other loads. In consequence, the ignition coil generates no high voltage. It follows, therefore, that the engine of the automobile stops working as soon as the engine key switch 6 is opened.

Although the rectifier 11 is connected to the positive side of the d-c permanent magnet motor 3 in FIG. 2, it is needless to say that the rectifier 11 may inserted at any portion of the circuit if it is able to prevent the current generated by the d-c permanent magnet motor 3 from flowing into the loads including the ignition coil 2. If a plurality of d-c permanent magnet motors are provided, each permanent magnet motor may be provided with a rectifier 11 or a group of all the permanent magnet motors may be provided with a single rectifier 11.

Figure 3:
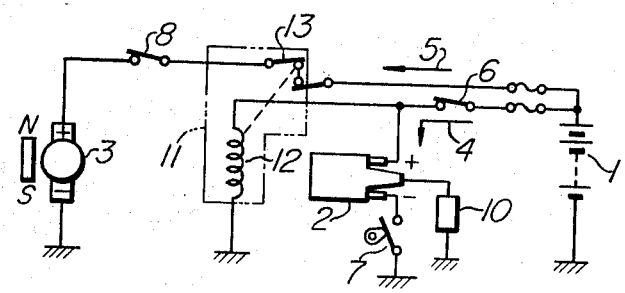

Referring to FIG. 3 which shows an electric wiring diagram of another embodiment of the present invention, the numeral 11 identifies a relay, 12 is an exciting coil thereof and connected in parallel to the ignition coil and the numeral 13 indicates a normally open contact of the relay 11 and inserted between the source battery 1 and the d-c permanent magnet motor 3.

In the above embodiment, when the engine key switch 6 is opened, the current stops flowing in the exciting coil 12 of the relay 11, thereby opening the normally open contact 13 which is closed when the current flows through the exciting coil 12. Consequently, even if the d-c permanent magnet motor 3 generates power due to the force of inertia, the current so generated does not flow into the ignition coil 2 or other loads, completely cutting off the ignition coil 2 from the power supply. Therefore, no high voltage is produced in the ignition coil 2. So, the gasoline engine of the automobile stops running immediately after the engine key switch 6 is opened.

Further, according to this embodiment, the current which flows from the source battery 1 into the d-c permanent magnet motor 3 does not pass through the engine key switch 6. As a result, this engine key switch 6 has current capacity in reserve which prevents it from becoming overheated.

Figure 4:
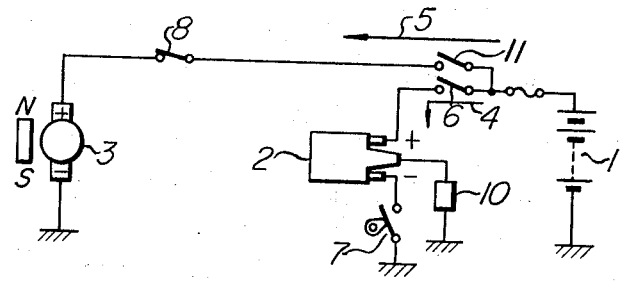

An electric wiring diagram of still another embodiment of the present invention is shown in FIG. 4, in which in addition to the circuit structure in FIG. 1 the switch 11 which opens and closes in concert with the engine key switch 6 is inserted between the d-c permanent magnet motor 3 and the storage battery 1, the circuit of the ignition coil 2 and that of the d-c permanent magnet motor 3 being separately connected to the respective switch. Since opening the engine key switch 6 opens the switch 11, the current generated by the inertia force of the d-c permanent magnet motor 3 does not flow in the loads including the ignition coil 2 resulting in no high voltage being generated therein. In other words, the gasoline engine comes to a stop as soon as the engine key switch 6 is opened.

Furthermore, in this embodiment, the currents from the source battery 1 to the circuit including the ignition coil 2 and to the one including the d-c permanent magnet motor 3 are interrupted by the engine key switch 6 and the switch 11 respectively, namely, the electric current from the source battery 1 is divided into two paths: one through the engine key switch 6 to the ignition coil 2 and the other through switch 11 to d-c permanent magnet motor 3. Therefore, it follows that the engine key switch 6 leaves a margin of current capacity in this embodiment, too, thus preventing the engine key switch 6 from being overheated.

Figure 5:
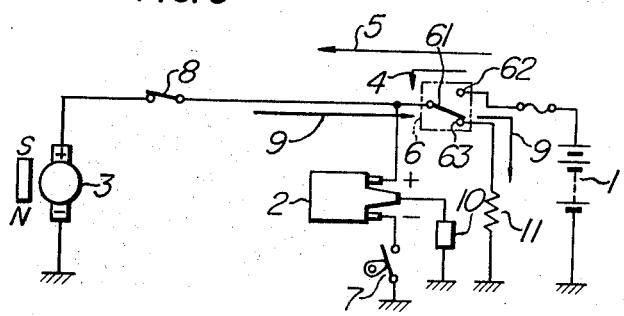

FIG. 5 illustrates an electric circuit diagram of a still another embodiment of the present invention, in which besides the circuit components in FIG. 1 an earth contact 63 which closes when the movable contact 61 is detached from the power side terminal 62 of the engine key switch 6 is connected with the key switch 6 to interrupt the power supply from the source battery to the parallel load circuit comprising the ignition coil 2 and the d-c permanent magnet motor 3. The numeral 11 identifies a resistor with a resistance 0 to 10 Ω smaller than that of the ignition coil 2. The resistor 11 is inserted between the earth contact 63 and the ground. As can be seen from the figure, the moment the movable contact 61 of the engine key switch is detached from the power side terminal 62, the movable contact 61 comes into contact with the earth contact 63 and the power generated by the inertia force of the d-c permanent magnet motor 3 flows into the ground through the movable contact 61, the earth contact 63 and the resistor of a low resistance value 11 in the direction of the arrow 9. Hence, very little current due to the inertia force flows through the ignition coil 2 and other loads and so no high voltage is generated in the ignition coil 2. What is more, the d-c permanent magnet motor 3 immediately comes to a stop because the current generated by the inertia force is consumed in the form of Joule's heat due to the resistor 11, the armature resistance of the d-c permanent magnet motor 3 and the resistance of the lead wire, that is, due to dynamic braking. As a consequence, the gasoline engine of the automobile immediately comes to a stop by detaching the movable contact 61 from the power side contact 63 of the engine key switch 6.

In the embodiment mentioned above, the resistor 11 is inserted between the earth contact 63 and the ground to positively control generation of excessive current due to the force of inertia in the d-c permanent magnet motor 3, thereby not only preventing the armature coil thereof from being overheated, but also contributing to the dynamic braking. But even without the resistor 11, an armature coil of a small sized d-c permanent magnet motor as is used for a car cooler or heater will not be damaged with the current generated by the inertia thereof. In addition, the resistance of the armature coil of said motor and the resistance of the lead wire consume so much of the power thus generated that dynamic braking is made possible.

We claim:

1. In an automobile gasoline engine comprising a source battery, an engine key switch, at least one d-c permanent magnet motor and energizing circuit which is connected to said source battery and is actuated in concert with the operation of said switch and an ignition coil connected through said switch to said source battery, a device for preventing continuation of ignition in said automobile gasoline engine after said key switch has been opened, said device including:
    means for preventing current flow due to a voltage generated by said d-c permanent magnet motor from said d-c permanent magnet motor to said ignition coil.

2. A device for preventing continuation of ignition in an automobile gasoline engine according to claim 1, in which said current-preventing means includes at least one rectifier in series with said d-c permanent magnet motor which rectifier allows the current to flow from said source battery to said motor, but not from said motor to said ignition coil.

3. A device for preventing continuation of ignition in an automobile gasoline engine according to claim 2, in which a plurality of d-c permanent magnet motors are connected in parallel with said source battery through said engine key switch, and said current-preventing means includes a plurality of recitifers, with at least one rectifier inserted between each of said d-c permanent magnet motors and said engine key switch.

4. A device for preventing continuation of ignition in an automobile gasoline engine according to claim 2, in which a plurality of d-c permanent magnet motors are connected in parallel with said storage battery through said engine key switch, and said current-preventing means includes a common rectifier inserted between said engine key switch and the group of said plurality of parallel-connected d-c permanent magnet motors.

5. A device for preventing continuation of ignition in an automobile gasoline engine according to claim 1, in which said current-preventing means includes a relay having an exciting winding connected in parallel with the primary side of said ignition coil and a normally open contact inserted between said d-c permanent magnet motor and said source battery.

6. A device for preventing continuation of ignition in an automobile gasoline engine according to claim 1, in which said current-preventing means comprises a switch which is inserted between said d-c permanent magnet motor and said source battery and which opens in connection with the opening of said engine key switch.

7. A device for preventing continuation of ignition in an automobile gasoline engine according to claim 1, in which said current-preventing means comprises a switch which is inserted between an ungrounded terminal of said d-c permanent magnet motor and the ground and closes in connection with the opening of said engine key switch.

8. A device for preventing continuation of ignition in an automobile gasoline engine according to claim 7, in which a resistor with resistance value sufficiently lower than the resistance value of said ignition coil is inserted between said switch and the ground.

* * * * *